United States Patent [19]

Jenks

[11] 3,969,557
[45] July 13, 1976

[54] FIBERGLASS VAULTING POLE

[75] Inventor: Herbert R. Jenks, Carson City, Nev.

[73] Assignee: AMF Incorporated, White Plains, N.Y.

[22] Filed: Feb. 27, 1975

[21] Appl. No.: 553,604

[52] U.S. Cl. ............................... 428/36; 156/173; 156/184; 156/190; 428/377
[51] Int. Cl.² ...................... B32B 3/20; B65H 81/00
[58] Field of Search ............ 428/36, 377, 378, 367; 156/173, 188, 184, 190; 273/DIG. 7, 80, 81; 272/59 C; 294/19 R

[56] References Cited
UNITED STATES PATENTS

| | | | |
|---|---|---|---|
| 2,809,144 | 10/1957 | Grimes | 273/DIG. 7 |
| 3,166,319 | 1/1965 | Brilhart | 273/DIG. 7 |
| 3,279,333 | 10/1966 | Blair et al. | 156/190 |
| 3,429,758 | 2/1969 | Young | 156/173 |
| 3,491,999 | 1/1970 | Lindler | 273/DIG. 7 |
| 3,522,122 | 7/1970 | Ganahl | 156/173 |
| 3,810,803 | 5/1974 | Karp et al. | 273/DIG. 7 |

Primary Examiner—Marion E. McCamish
Assistant Examiner—P. J. Thibodeau
Attorney, Agent, or Firm—George W. Price; Walter Lewis

[57] ABSTRACT

The vaulting pole has at least three layers, two of the layers comprising fiberglass tape helically wound along the pole into a succession of butt-jointed turns with the fibers thereof extending primarily lengthwise of the tape but the turns of the two layers being crossed with respect to each other, and the third layer comprising a plurality of turns of fiberglass cloth sandwiched between the two tape layers, the fibers of the cloth extending primarily lengthwise of the pole.

3 Claims, 2 Drawing Figures

FIBERGLASS VAULTING POLE

This invention relates to a vaulting pole, and more particularly to an improved fiberglass vaulting pole and a method of making the same.

It is an object of this invention to provide an improved lightweight fiberglass pole vault having high hoop and flex strength and resistance to splitting, and a low cost and uncomplicated method of manufacturing the same.

Figure 1:
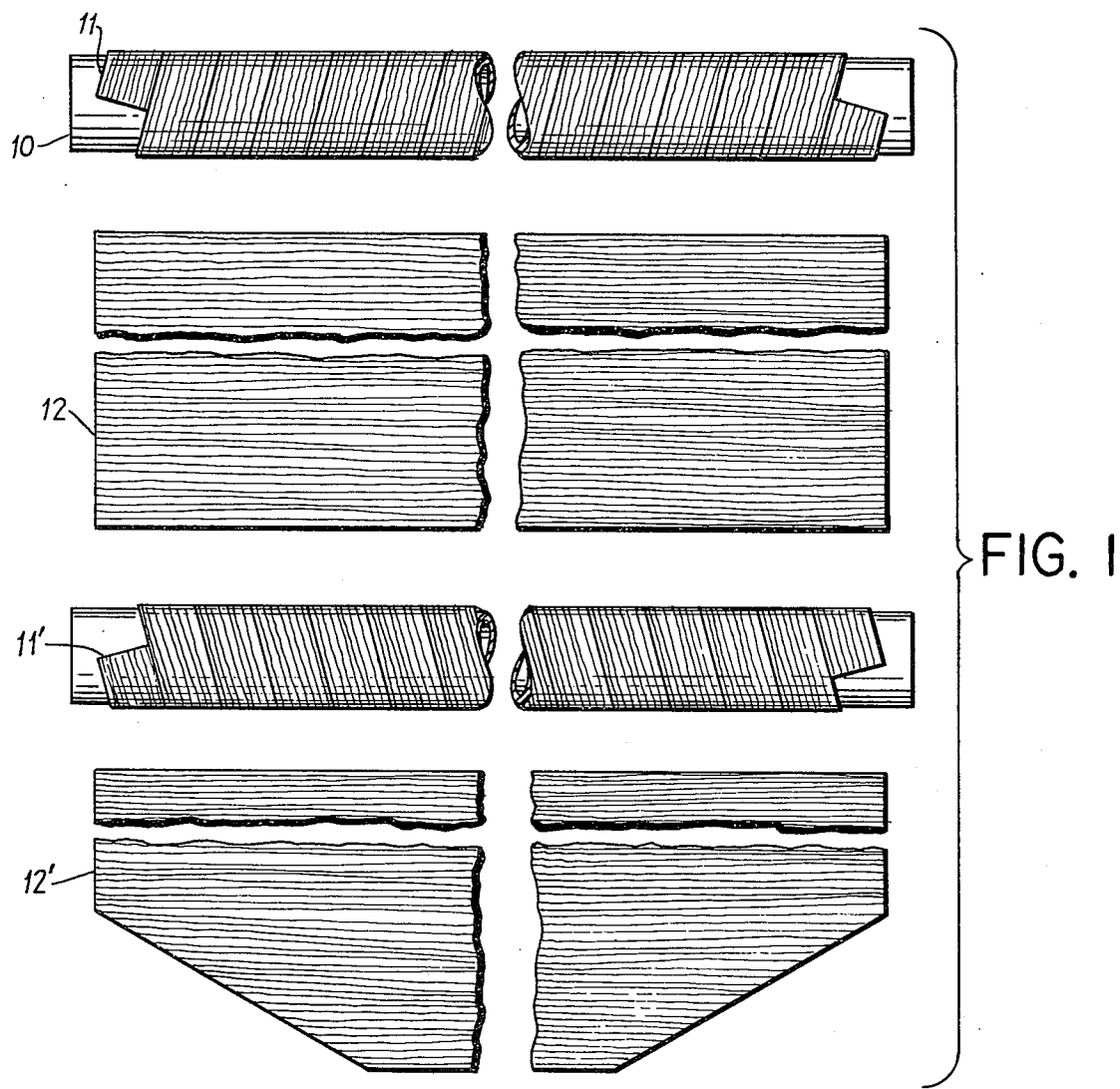
Figure 2:
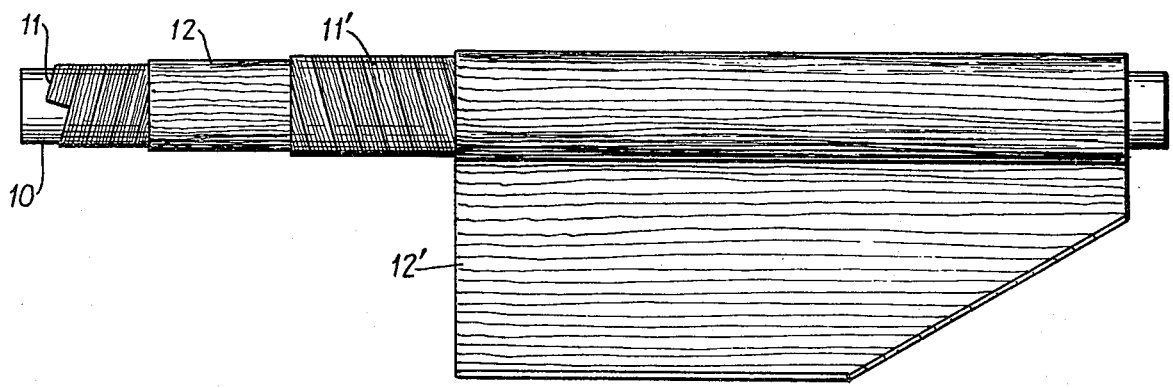

The invention will be best understood by considering the following detailed description and accompanying sheet of drawing in which FIG. 1 is an illustration of the method and FIG. 2 is a broken away view of the product.

In the drawing, part 10 is an elongated hollow metallic mandrel. The pole vault is built up on the mandrel. Therefore, the exterior of the mandrel matches the interior of the finished pole. The mandrel has a slight taper to it so that it can be withdrawn from within the finished pole.

The pole is built up on the mandrel by first helically winding epoxy impregnated fiberglass tape 11 into a continuous succession of butt-jointed turns. The fibers of the tape 11 extend primarily lengthwise of the tape, and this comprises the innermost fiberglass layer of the pole. The tape is wound tight on the mandrel so that the layer is smooth.

Next, a rectangular shaped piece of epoxy resin impregnated fiberglass broadcloth 12 is wrapped for a plurality of turns over the tape 11. The fibers of the cloth extend primarily lengthwise of the mandrel, and like the tape 11, the cloth 12 is tight wrapped so that there is no looseness, kinks, folds or the like.

Next, another tape 11' is helically wound over the cloth 12. The tape 11' is identical to the tape 11 and everything is the same as with the first tape layer except that the wind is in an opposite sense so that the turns of the second tape are crossed with respect to those of the first tape.

Next, the previous cloth wrapping step is repeated, but with an isosceles trapezoidal shaped cloth 12'. That is to say, everything is the same except that the cloth has a different geometry.

After this, the fiberglass taped and wrapped mandrel 10 with its four fiberglass layers 11, 12, 11', 12' goes into an elongated curing chamber to apply heat to cure the resin and external pressure to compact the fiberglass to bond all the fiberglass and epoxy into a unitary rigid structure. After cooling, the mandrel can be withdrawn. The heat and pressure cure and the apparatus for the same is well-known in the art, so will not be further described. Also, as is well-known in the art, the pole is cut at its ends to final length and capped. Additionally, further operations can be performed in the nature of cosmetics depending on what kind of final external appearance is desired.

The gist of the invention resides in the three layers 11, 12, 11'. The utilization of the trapezoidal layer 12' per se is not new, nor does it have to be the exterior most layer. It could be between the layers 12 and 11'. However, having it on the outside has the advantage that it can be utilized as a means for making adjustments in the pole in a given production run by varying the shape of the trapezoid and the number of turns thereof.

Referring particularly to FIG. 2, and especially to the three layers 11, 12, 11', this arrangement provides advantages over the prior art. The turns of the two tapes 11 and 11' give great hoop strength to the pole. This is for several reasons. One is that their fibers extend primarily around the pole, as contrasted to woven tape which might have as much as 50% of its fibers extending lengthwise of the pole and not contribute to hoop strength. In addition, since the taped turns are crossed with respect to each other, the butt joints of each tape layer are reinforced by tape from the other layer. To look at it another way, if the two tapes were wound in the same sense, the butt-joints of both layers would be aligned, and this would present areas of potential weakness when the pole is bent.

Since the sheet or broadcloth 12 is sandwiched between the two tape layers, its lengthwise fibers are firmly fixed in position to be resistant to separation or splitting. This enables the layer 12 to act as a true column load bearing member. In prior art woven cloths, as much as 50% of the fibers extended in directions other than lengthwise of the pole so that in effect about one half of the fibers did not act as column load bearing filaments.

From what has been just said with respect to the tapes and cloths, it is apparent that in effect they are unidirectional fiberglass materials. A very small or negligible percent of their total fibers are transverse of the tape or cloth, and this is merely to hold the lengthwise fibers together for purposes of handling the materials. In my invention the fibers in the tape extend primarily lengthwise thereof or around the pole, and in the cloths the fibers extend primarily lengthwise of the pole. That is to say, to the greatest extent possible, woven tapes and cloths are avoided. This is because woven fibers are kinked, and I have found that kinking in the fibers can actually contribute to pole failure. That is to say, non-kinked fibers are stronger from the standpoint of both radial forces (hoop strength) and lengthwise forces (column load bearing capacity).

Some detailed data will now be set forth to provide a working example of the invention; however, it is to be appreciated that this is for illustrative purposes only and not intended to be limiting on the true scope of the invention.

For the tapes 11 and 11' I have used 1 inch wide tape pre-impregnated with thermosetting epoxy resin. One has comprised No. 8303-1557 tape by Narmco Materials Inc., Costa Mesa, California; and the other MXB 7409-1557 tape by Fiberite West Coast Corp., Orange, California. These two are equivalent and have about 90% of their fibers lengthwise of the tape and about 10% transverse. When received, they are about 9/1000 to 10/1000 inch thick, and are about 7/1000 inch thick in the finished pole.

The sheet or broad goods 12 and 12' have comprised No. 8303-7576 by Narmco and MXB 7409-7576 by Fiberite. These cloths have about 97% of their fibers oriented lengthwise, and about 3% transverse. When received they are about 15/1000 inch thick and in the finished pole about 12.5/1000 inch thick. There can be 2–6 wraps of the cloths about the pole depending upon the weight of the pole. By weight of the pole what is meant is the weight of the pole vaulter.

The two tapes 11 and 11' and the cloth 12 extend the full length of the pole. The cloth 12' covers 85–100% of the pole length, depending on the weight of the pole and model. Generally speaking, a model for beginners or the novice vaulter will have about 100% of its length covered by the sheet 12' to strengthen it at both ends to protect it against abuse. However, with the serious vaulter, about the top 15% of the pole (the handle end) would not be covered by the sheet 12'. In other words, for the expert vaulter the handle end of the pole would have only the three layers 11, 12, 11'. The remainder of the pole would have the fourth layer 12' extend clear to the butt end of the pole, since this end receives a great deal of wear and tear. If desired, a short fifth piece of fiberglass can be wrapped around the butt-end to increase its durability.

I claim:

1. An elongated and hollow vaulting pole having at least three layers of fiberglass which are bonded together, two of said layers comprising fiberglass tape extending the length of said pole in a succession of butt-jointed helical turns, said tape having the fibers thereof oriented primarily lengthwise of said tape, the turns of one of said two layers being oriented crosswise of the turns of the other of said two layers, and the third of said three layers being positioned between said two layers and comprising a plurality of turns of fiberglass cloth extending the length of said pole, said cloth having the fibers thereof oriented primarily lengthwise of said pole.

2. In a vaulting pole as in claim 1, a fourth layer of fiberglass comprising a plurality of turns of an isosceles trapezoidal shaped fiberglass cloth extending lengthwise of said pole and having the fibers thereof oriented primarily lengthwise of said pole, and an epoxy resin impregnating and bonding said four layers together.

3. A method of manufacturing a vaulting pole, comprising helically winding epoxy resin impregnated fiberglass tape having the fibers thereof oriented primarily lengthwise of said tape into a succession of butt-jointed turns on an elongated mandrel, then wrapping a rectangular shaped piece of epoxy impregnated fiberglass cloth having the fibers thereof oriented primarily lengthwise of said mandrel over said tape for a plurality of turns, then repeating said tape winding step over said cloth, but in an opposite sense to orientate the turns thereof crosswise with respect to the turns of the first tape winding step, then repeating said cloth wrapping step but with an isosceles trapezoidal shaped piece, and then curing said epoxy resin and bonding all said fiberglass tape and cloth together into a unitary rigid structure by applying heat and external pressure to said resin impregnated fiberglass.

* * * * *